United States Patent [19]
Tully et al.

[11] Patent Number: 5,824,418
[45] Date of Patent: Oct. 20, 1998

[54] OPTICALLY TRANSPARENT, ELECTRICALLY CONDUCTIVE SEMICONDUCTOR WINDOWS

[75] Inventors: John W. Tully, Rolling Hills Estates; Don L. McCoy, Lakewood; Richard F. Sorensen, Long Beach, all of Calif.

[73] Assignee: Northrop Grumman Corporation, Los Angeles, Calif.

[21] Appl. No.: 523,733

[22] Filed: Sep. 5, 1995

[51] Int. Cl.⁶ ............................................. H01L 33/00
[52] U.S. Cl. ........................ 428/426; 257/53; 257/56; 257/57; 257/58; 257/64; 257/103; 257/352; 257/347; 257/433; 257/434; 257/615; 257/616; 359/580; 359/585; 359/589; 428/332; 428/446; 428/432; 428/433; 428/704; 428/469
[58] Field of Search ................................... 428/432, 704, 428/216, 336, 446, 469, 433, 426, 332; 257/53, 56, 57, 58, 64, 103, 352, 347, 433, 434, 615; 359/580, 585, 589

[56] References Cited

U.S. PATENT DOCUMENTS

| | | |
|---|---|---|
| 4,034,181 | 7/1977 | Packard . |
| 4,265,974 | 5/1981 | Gordon . |
| 4,371,740 | 2/1983 | Clem ........................................ 428/432 |
| 4,710,433 | 12/1987 | Rowe et al. . |
| 4,733,284 | 3/1988 | Aoki . |
| 4,778,731 | 10/1988 | Kratz et al. . |
| 4,939,043 | 7/1990 | Biricik et al. . |
| 5,008,718 | 4/1991 | Fletcher et al. . |
| 5,173,443 | 12/1992 | Biricik et al. . |
| 5,212,395 | 5/1993 | Berger et al. . |
| 5,425,983 | 6/1995 | Propst et al. ............................. 428/216 |

OTHER PUBLICATIONS

Article in Semiconductor Wafer Bonding: Science, Technology, and Applications U. Gosele et al., Eds. Proceeding of the first International Symposium, vol. 92–7, Published by the Electrochemical Society, Inc., 1992 entitled: Van der Waals Bonded III–V films for Optoelectronics, by Chan, Winston K., and Yablonovitch, pp. 123–131.

*Primary Examiner*—Archene Turner
*Attorney, Agent, or Firm*—Terry J. Anderson; Karl J. Hoch, Jr.

[57] ABSTRACT

A semiconductor window which is transparent to light in the infrared range and which has good electrical conductivity is formed of a prefabricated semiconductor sheet bonded to a substrate material by optical contact. The sheet is a substantially uniformly doped wafer sufficiently thin that inherent absorption bands do not affect transmission. The sheet is contact bonded to the surface of an undoped transparent substrate without diffusion, growth or deposition on the surface. Windows having particular optical band pass characteristics are formed utilizing a zinc selenide substrate and a gallium arsenide sheet.

16 Claims, 1 Drawing Sheet

OPTICALLY TRANSPARENT, ELECTRICALLY CONDUCTIVE SEMICONDUCTOR WINDOWS

FIELD OF THE INVENTION

The present invention relates generally to windows having an infrared transparent substrate and a transparent, electrically conductive semiconductor sheet laminated thereto.

BACKGROUND OF THE INVENTION

Transparent conductive windows through which optical energy must pass and which have good electrical conductivity have utility in a number of applications. These include resistance heated windows, electromagnetic interference (EMI) shielded windows, anti-static windows and transparent electrodes.

In U.S. Pat. Nos. 4,778,731, 4,939,043, and 5,173,443, transparent conductive windows, coatings and methods of manufacture are described. In these patents the conductive component was either a thin coating applied by vacuum deposition techniques or a doped layer of semiconductor fabricated, in situ, into the structural window substrate made of the same semiconductor, or at least a compatible semiconductor.

Windows fabricated utilizing a thin conductive coating applied by vacuum deposition require the use of substrate materials that are limited by that coating. In general, such thin conductive coatings are very heavily doped amorphous semiconductors. Such materials exhibit high infrared absorption due to free carrier absorption. To achieve high optical transmission, the layer conductivity must be maximized. This tradeoff of conductivity for transmission usually limits this approach to window substrate materials that are semiconductors having either single crystal or large-grain polycrystalline structures. Thus the substrate sizes available restricts the final window dimensions. Additionally, the doped semiconductor coating fabrication is an expensive procedure.

Windows fabricated using a semiconductor as both the structural component (substrate) and the conducting coating are limited by the thickness of the semiconductor needed for structural strength. While the preferred semiconductors, Si, Ge, and GaAs, are low absorbing materials, they do have absorption bands within the normal optical bands of interest for windows. When windows are constructed with thickness needed for structural strength the transmission loss due to this absorption can be substantial.

Window material which are highly transparent in the infrared, such as ZnSe, are polycrystalline materials having small grain sizes. These materials cannot be doped to achieve a low loss conducting coating. Growth of a conducting coating on them via heteroepitaxy results in low mobility and, therefore, optically lossy windows.

There is, therefore, a need for an improved transparent, electrically conductive window.

OBJECTS AND SUMMARY OF THE INVENTION

In general, it is an object of the present invention to provide novel transparent conductive windows together with a method for their manufacture which will overcome the above disadvantages and limitations.

It is a further object to provide a window and manufacturing method of the above character having increased transmissibility over wider bands, greater mechanical durability, and greater ease and economy of fabrication.

It is a further object of the invention to provide an improved semiconductor window which is transparent to light in the infrared range and which exhibits desired optical band pass characteristics while maintaining good electrical conductivity.

Another object of the invention is to provide an improved semiconductor window and manufacturing method of the above character for use in the 1 micron to 16 micron band and which possesses an electrical sheet resistance of less than 100 ohms per square while maintaining optical transmittance as high as approximately 98% or more averaged over the band and carrier mobility greater than about 400 $cm^2$/Volt-sec.

The present invention is predicated on the realization that enhanced performance and production efficiency of infrared transparent electrically conductive windows can be obtained by utilizing separate components in a novel composite or laminated window structure to independently perform the multiple functions previously achieved by windows having a doped semiconductor substrate. Existing compromises in performance and economy of a substrate required to obtain an acceptable balance of conductivity, transmissibility and mechanical integrity are eliminated herein as discussed below.

The approach of the present invention is to bond by optical contact, a prefabricated infrared transparent electrically conducting sheet to one side of a highly transparent load bearing structure to form a laminate of substrate with a conducting layer a manner so that optical transmission of the assembly is preserved.

More particularly, a thin sheet of infrared transparent semiconductor material is doped to be electrically conducting and then optically contacted to an undoped transparent substrate. A virtually smooth surface on the substrate and a complementary virtually smooth surface on the prefabricated layer are positioned in mutual intimate contact so that a negative pressure is created between the surfaces effective to bond the layer to the substrate without diffusion, growth or deposition of a layer on the substrate surface. In one embodiment of the invention, peripheral edges of the sheet and substrate are sealed together with a sealant to prevent encroachment of air between the layer and the substrate.

Devices of the invention include semiconductor layers including gallium arsenide, silicon, germanium and indium phosphide, and which are substantially uniformly doped prior to bonding to a substrate by a method including bulk doping, diffusion, epitaxy and ion implantation.

Because the semiconductor layer is a separate component doped to a level which yields a desired surface conductivity prior to assembly with the substrate, selection criteria for the substrate material do not include semiconductor characteristics so that transparency and mechanical strength are optimized. Since conductivity of a window is independent of the substrate material, the present invention uniquely permits the use of small grain poly-crystalline substrate materials without compromising substantially high transparency of the substrate during manufacture. Ease and economy of production are observed as a result of the versatility in substrate material selection.

Devices of the invention include window substrates made of a material selected from zinc selenide, zinc sulfide, zinc sulfide coated zinc selenide, chalcogenide glass, and sapphire.

The present invention further envisions a method for making conductive infrared transparent windows of the character discussed above. A thin sheet of infrared transparent semiconductor material is optically bonded to the surface of an undoped substrate without diffusion, growth or deposition by forming a virtually smooth surface on the substrate and by forming a complementary virtually smooth surface on the sheet and placing the smooth surfaces into mutual intimate contact to create a negative pressure between the surfaces effective to bond the sheet to the substrate whereat it forms a conductive layer thereon.

These and other objects and features of the invention will become apparent to those skilled in the art to which it pertains from the following description and claims when taken with the appended drawings, of which:

Figure 1:
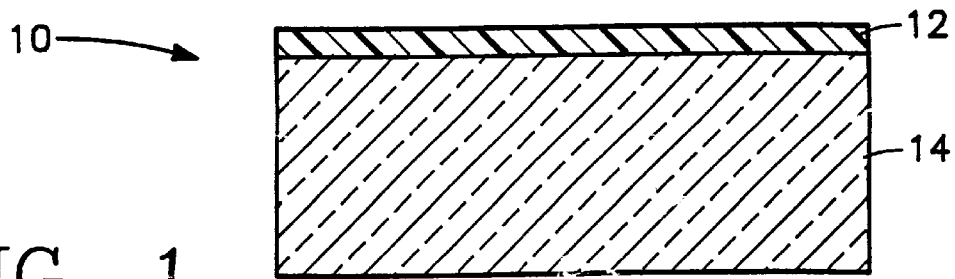
FIG. 1 is a schematic drawing illustrating the structure of a window constructed in accordance with the present invention.

As used herein, the term "doping" and "doped" refers to the procedure by which an impurity concentration is established in a semiconductor by diffusion, epitaxial deposition, ion implantation, or other means.

DETAILED DESCRIPTION OF THE PREFERRED EMBODIMENTS

The windows of the present invention have a substrate which is highly transparent to infrared radiation. An electrically conductive sheet is formed separately from the substrate and then optically bonded to the substrate to form a conductive layer thereon. Prior to bonding to the substrate, the sheet is doped with an appropriate dopant to render the sheet conductive but still remain transparent. Generally, the sheet will be of a thickness of from 100 to about 500 microns thick.

The substrate can be selected for properties other than its being a semiconductor as, for example, for its transparency and mechanical properties. Depending on the particular substrate and layer selected, windows of the invention will include transparency up to about 16 microns as, for instance, in a range of from about 1 micron to about 16 microns. Thus, windows according to the invention include infrared transparency from near to long IR (infrared).

The prefabricated semiconductor layer is attached to the surface of the substrate in a manner which advantageously has a negligible effect on optical transmittance in the infrared spectrum. Rather than grow or diffuse the semiconductor layer on or into the substrate, the invention discloses use of a bonding technique in which virtually smooth complementary surfaces are formed on the substrate and the layer prior to assembly of the window. The surfaces then are positioned in mutual intimate contact to create a negative pressure between the surfaces effective to bond the layer to the substrate.

To augment the properties of these windows, a series of "stack" of dielectric anti-reflection coatings may be deposited on the bottom exposed surface of the substrate or the upper exposed surface, or both, of the semiconductor layer. These coatings are typically made of materials such as germanium and zinc sulfide and have layer thicknesses of the order of 0.3 microns.

Loss-free laminating of a separate semiconductor sheet as a layer and load bearing substrate as disclosed herein offers several benefits. As opposed to prior windows in which an amorphous conductive layer is deposited, as by vacuum deposition or sputtering, on the surface of the substrate (and thereby reducing carrier mobility), the present invention permits the use of substrate materials which are not semiconductors having costly single crystal or large-grain poly-crystalline structures. Final window dimensions consequently are not restricted by the limited sizes of such substrates which currently are available. Also, window materials which are highly transparent in the infrared, such as zinc selenide, typically are poly-crystalline materials having small grain size and cannot be doped to achieve a low loss conducting layer. Growth of a conducting coating or layer on the them, such as by heteroepitaxy, heretofore results in low mobility and, therefore, optically lossy windows. Windows constructed according to the present invention overcome this problem and permit the use of such highly infrared transparent poly-crystalline materials as a substrate without compromising transmissivity.

In taking into account the above teachings, useful for substrates for the windows of the invention are zinc selenide, zinc sulfide, zinc sulfide coated zinc selenide, chalcogenide glass, and sapphire. Useful for the semiconductor layers are gallium arsenide, silicon, germanium and indium phosphide.

Zinc selenide and zinc sulfide are particularly useful for window substrates because of their broad band (up to 12 to 14 microns) and their ability to remain transparent at temperatures up to 400° F. Zinc selenide coated with a layer of zinc sulfide combines the performance advantages of each of its constituents.

Germanium which also has a broad transparency band (up to 12 microns) becomes opaque at elevated temperatures and therefore is not a substrate of choice for applications which would involve elevated temperatures. However, germanium is still an agent of choice for conductive layers when used in the present invention as a relatively thin sheet as, for instance, less than 50 microns. In a thickness of less than 50 microns, germanium remains transparent at temperatures of up to 400° F.

Also useful for high temperature layers is gallium arsenide. Gallium arsenide also has a very broad band (up to 16 microns) in the long infrared. Gallium arsenide is also useful as a high temperature substrate, however, because at the present time large windows of gallium arsenide are not available, if gallium arsenide is used as a substrate, generally the window size will be limited with respect to its cross sectional area to the sizes of gallium arsenide substrates which are presently available.

As opposed to gallium arsenide, zinc selenide and zinc sulfide windows are available in large sizes as, for instance, one inch thick with lateral dimensions greater than 12 inches. Thus, these substrates are particularly useful in those instances wherein large windows are desired, especially those which would be exposed to high temperatures.

Dopants for the separately formed semiconductor layer of the windows of the invention can be selected as either p type dopants or n type dopants.

For germanium or silicon layers, n type dopants are selected from lithium, phosphorous, arsenic, antimony, bismuth and p type dopants are selected from boron, aluminum, gallium, indium, zinc and thallium.

For gallium arsenide or indium phosphide layers, n type dopants are selected from sulfur, selenium, tin, tellurium, germanium, silicon and p type dopants are selected from silicon, germanium, magnesium, lithium, zinc, manganese, cadmium, and beryllium. Since silicon and germanium are amphoteric they are useful for both n and p type gallium arsenide dopants.

Dopant concentration in the layer takes into consideration material properties and temperatures. The overall sheet resistance of the prefabricated doped layer is a combination of the sheet thickness and the resistivity. The concentration is selected to achieve the necessary carriers for sheet resistance without detracting from the optical properties of the layer. Generally the lower the dopant concentration the higher the resistivity and the higher the dopant concentration the lower the resistivity. Temperature is considered for those dopants and layer combinations which may be effected by temperatures such as lithium, in germanium. Since lithium is a fast diffuser, an appropriate lower temperature environment must be used for both the formation and operation of windows of the invention utilizing lithium doped germanium. Further in using zinc as a dopant in silicon, while it is not as temperature dependent as Li or Ge, either device cooling must be provided or a shorter device lifetime expected.

In view of the above, a first preferred window of the invention includes a zinc selenide substrate having a pre-doped gallium arsenide sheet bonded thereto by optical contact.

A further preferred window of the invention includes a zinc selenide substrate having a pre-doped silicon, germanium, or indium phosphide sheet bonded thereto by optical contact.

A further preferred window of the invention includes a zinc sulfide, zinc sulfide coated zinc selenide, chalcogenide glass, or sapphire substrate which has a pre-doped semiconductor layer bonded thereto by optical contact.

Typically, a pre-doped semiconductor layer will be bonded on an appropriate substrate utilizing a bonding technique wherein virtually identical smooth surfaces are formed on the substrate and the layer. The smooth surfaces are positioned in mutual intimate contact to create a negative pressure between the surfaces effective to bond the layer to the substrate without diffusion, growth or deposition on the substrate surface.

Referring to FIG. 1, an optically transparent electrically conductive semiconductor window according to the present invention is designated generally by the numeral 10 and has a semiconductor sheet 12 and a transparent substrate 14. The sheet 12 contains a dopant which yields a desired surface conductivity of the window 10 while the substrate 14 provides suitable mechanical strength and load bearing capability of the window 10. As described below, the sheet 12 is bonded to the substrate 14 by optical contact without diffusion, growth or deposition on the substrate surface so that transparency of the substrate is not affected.

The sheet 12 comprises a thin layer or wafer of infrared transparent material selected from the group consisting of gallium arsenide, silicon, germanium and indium phosphide. A dopant is substantially uniformly distributed throughout the sheet prior to bonding with the substrate 14 in any of such known methods as bulk doping, diffusion, epitaxy, ion implantation or others. Inherent dopant forms with the material of sheet 12 a semiconductor having a sufficient carrier concentration of donors or acceptors that the semiconductor sheet acquires an electrical sheet resistance of less than 100 ohms per square while maintaining carrier mobility greater than about 400 $cm^2$/Volt-second. The sheet 12 is sufficiently thin that inherent absorption bands do not affect optical transmission.

The substrate 14 is a layer of highly transparent undoped zinc selenide having a thickness selected to make for a rigid, structurally self supporting unit. Prior windows which use a semiconductor as both the substrate and the conductive layer are faced with the difficult compromise of increasing thickness to achieve acceptable structural strength without unduly sacrificing transmission characteristics within the normal optical bands of interest. Since conductivity of a substrate is not critical to performance of windows according to the present invention, carrier mobility of the substrate is unrelated to window conductivity and the minimum thickness of a substrate is limited only by values associated with mechanical handling constraints. Windows according to the invention have been produced having a substrate thickness of the order of 0.25 inches.

A loss-free bond is obtained between the conductive sheet 12 and the substrate 14 by positioning the two components in a manner known previously by artisans in the field of optics as optical contacting. The technique of optical bonding or optical contacting two components involves forming effectively identical, virtually smooth surfaces on the components and placing the surfaces in intimate ("optical") contact with each other so that a vacuum (negative pressure) is created between the surfaces and the atmospheric pressure differential is effective to permanently secure the components to each other.

A desired smoothness of the surface finish of the mating surfaces is obtained prior to window assembly by sequentially polishing the surfaces with a series of abrasives having progressively decreasing roughness. In a preferred embodiment, the mating surfaces are polished with a grit made from a material selected from the group including alumina, diamond dust, or corundum. In a final grit polishing step, grit of a particle size of approximately 0.05 microns is used. In an exemplary embodiment, the surfaces then are polished with a colloidal silica polish.

After being polished, the mating surfaces then are cleaned to remove all dirt. In one embodiment, the surfaces are placed on a high-speed turntable and cleaned with a cotton swab while being drenched sequentially with water and alcohol. Preferably, the cleaning step is conducted in a low particle count hood of the order of less than 100 particles of size 5 microns or less per cubic foot to minimize the risk of contamination of the prepared surfaces. Excess liquid is removed from the surfaces with a high velocity stream of gas, such as nitrogen gas at room temperature.

Figure 2:
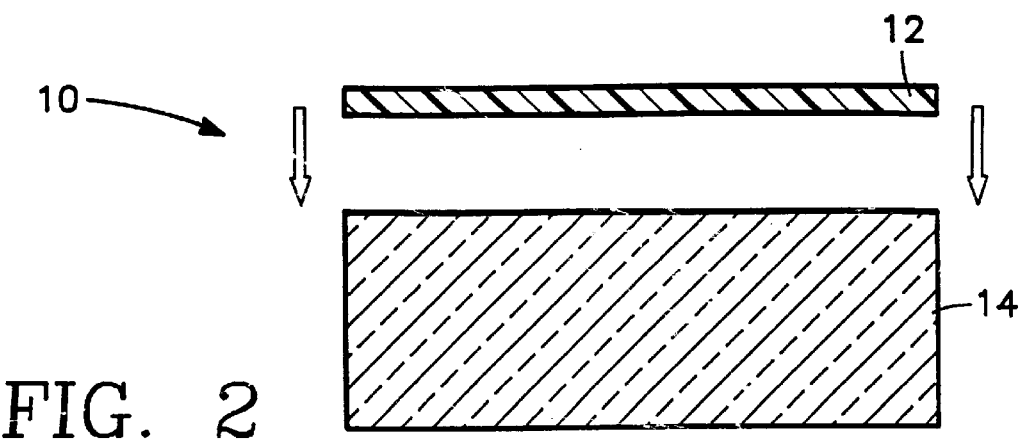
FIG. 2 is a diagram showing the assembly method of making the window of FIG. 1 in accordance with the present invention.

As shown in FIG. 2, the two surfaces are placed into contact with each other immediately after the cleaning step. Pressure is initially applied at the center of the assembly with the fingers of the assembler or by using a cotton swab. Pressure then is applied in a radially outward progressing manner to securely bond the components to each other. The assembly is then analyzed in a spectrometer to verify the components are in sufficiently intimate contact that there is no apparent interference in the infrared band.

EXAMPLE 1

A zinc selenide substrate 14 having a thickness of approximately 0.250 inches is optically bonded to a bulk doped gallium arsenide wafer 12 having a thickness of approximately 0.017 inches. Peripheral edges of the wafer—substrate laminate or sandwich are sealed with a known adhesive, such as RTV-11, to prevent debonding of the window due to the encroachment of air between the wafer 12 and the substrate 14.

Figure 3:
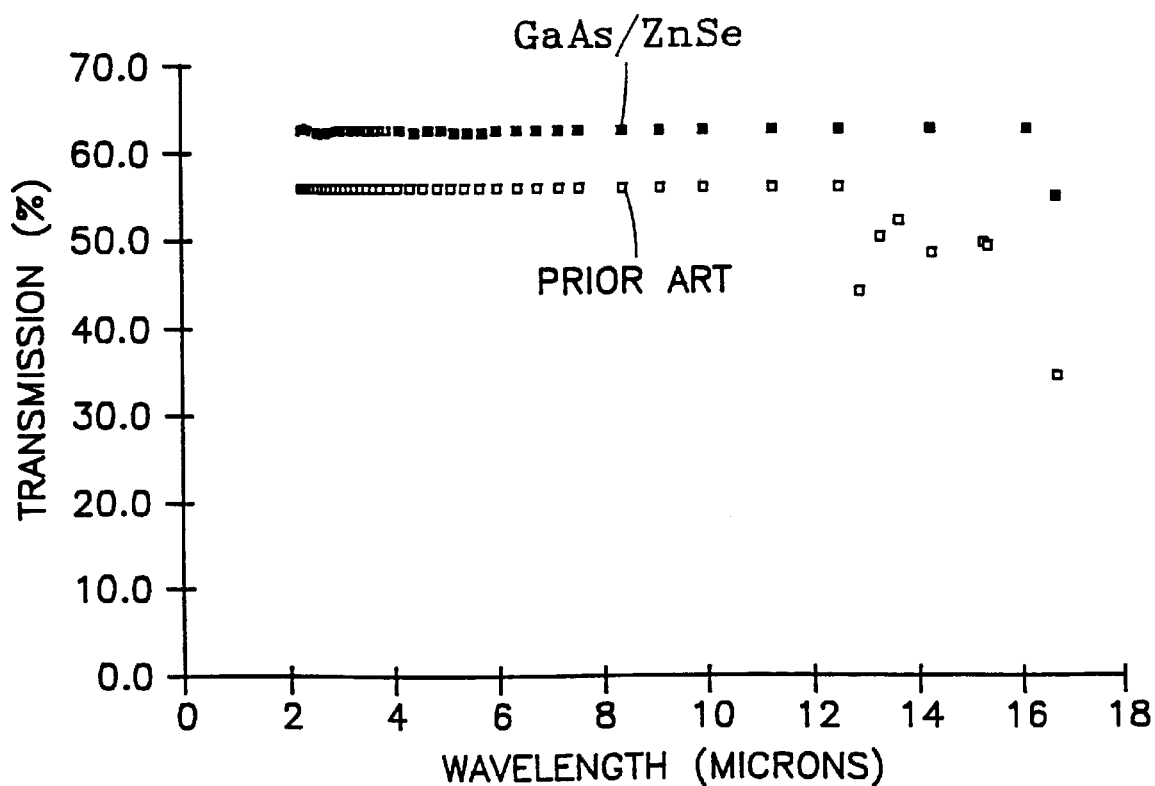
FIG. 3 is a graph illustrating the transmission characteristics of the window of FIG. 1.

The characteristics of a window according to Example 1 of the invention are shown in FIG. 3. This window has a sheet resistance of less than 100 ohms per square. As can be seen from the graph (upper curve), over 60% transmittance is provided in the infrared spectrum within an optical pass band from approximately 1 micron wavelength to about 16 microns wavelength.

FIG. 3 also reflects the improved performance of the invention compared to previous windows having a doped gallium arsenide layer (lower curve in FIG. 3). In thicknesses of gallium arsenide sufficient to provide acceptable mechanical strength (i.e., about 0.250 inches), intrinsic absorption of gallium arsenide reduces optical transmissibility at longer wavelengths. In addition to the substantial reduction in transmissibility at wavelengths above about 11 microns, transmissibility of windows having a doped gallium arsenide substrate only is notably less that achieved with the present invention over the entire infrared spectrum.

EXAMPLE 2

Layered over the doped conductive gallium arsenide layer 12 of Example 1 are a plurality of dielectric layers which are thermally evaporated on by techniques well known in the art to form an anti-reflection stack. These layers are formed of zinc sulfide, germanium and flouride compounds, and have thicknesses of the order of 0.3 microns. Similar dielectric layers are deposited on the bottom surface of the zinc selenide substrate 14. Inherent transmission of a window according to Example 2 is at least about 98.4% over the infrared spectrum.

While the invention has been described and illustrated in detail, it is to be understood that this is by way of illustration and example only and is not to be taken by way of limitation, the spirit and scope of the invention being limited only the terms of the following claims.

What is claimed is:

1. A conductive transparent window comprising:

a substrate formed in a manner to be substantially transparent over wavelengths of intended operation, said substrate made of a polycrystalline material having a grain size less than about 70 microns, said substrate being made to be transparent to infrared radiation, a thin sheet of infrared transparent semiconductor material with a dopant included therein in a manner to render said sheet electrically conductive having a significant carrier concentration of donors or acceptors, and said sheet and said substrate being placed in intimate contact for bonding the sheet to the surface of the substrate without diffusion, growth or deposition on the surface to thereby form a conductive window transparent to infrared radiation across the wavelengths of operation.

2. A transparent, conductive window of claim 1 wherein: said sheet is a prefabricated wafer.

3. A transparent, conductive window of claim 1 wherein: said sheet is made from material selected from the group consisting of gallium arsenide, silicon, germanium and indium phosphide.

4. A transparent, conductive window of claim 1 wherein: said sheet is doped by a method selected from the group consisting of bulk doping, diffusion, epitaxy and ion implantation.

5. A transparent, conductive window of claim 1 wherein: said sheet has a mono-crystalline structure.

6. A transparent, conductive window of claim 1 wherein: said dopant is substantially uniformly distributed in the sheet.

7. A transparent, conductive window of claim 1 wherein: said semiconductor sheet has carrier mobility greater than about 400 $cm^2$/Volt-sec.

8. A transparent, conductive window of claim 1 wherein: said substrate is made from material selected from the group consisting of zinc selenide, zinc sulfide, zinc sulfide coated zinc selenide, chalcogenide glass, and sapphire.

9. A transparent, conductive window of claim 1 wherein said conductive window is formed to have a thickness from the range of about 1 microns to about 16 microns.

10. A conductive infrared transparent window comprising:

a substrate made of a ply-crystalline material having a grain size less than about 70 microns, said substrate being made to be transparent to infrared radiation, a thin layer of transparent semiconductor material with a dopant contained therein to form with said layer a semiconductor having a significant carrier concentration of donors or acceptors, said dopant thereby causing said layer to exhibit conductivity with a sheet resistance of less than about 100 ohms per square, and means for bonding the layer to the surface of the substrate so that the window retains the infrared transparency thereof at a value greater than about 60% of optical transmittance over the infrared range.

11. An infrared transparent, conductive window of claim 10 wherein:

said substrate is made from material having grain size of less than about 5 microns.

12. An infrared transparent, conductive window of claim 10 wherein:

said layer is optically bonded to the substrate.

13. A conductive infrared transparent window comprising:

an undoped substrate formed in a manner to be substantially transparent, said substrate made of a polycrystalline material having a grain size less than about 70 microns, a thin sheet of infrared transparent semiconductor material, said sheet being made of a different material than the substrate, a dopant contained in said semiconductor sheet to form with said sheet a semiconductor having a significant carrier concentration of donors or acceptors, said dopant thereby causing said sheet to exhibit conductivity with a sheet resistance of less than about 100 ohms per square, and said sheet and said substrate being placed into optical contact for bonding the sheet to the surface of the substrate in a manner to be transparent to infrared radiation.

14. An infrared transparent, conductive window of claim 13 wherein:

said substrate is made from material selected from the group consisting of zinc selenide, zinc sulfide, zinc sulfide coated zinc selenide, chalcogenide glass, and sapphire.

15. An infrared transparent, conductive window of claim 13 wherein:

said substrate has a thickness of about 0.25 inches.

16. An infrared transparent, conductive window of claim 13 wherein:

said sheet is made from material selected from the group consisting of gallium arsenide, silicon, germanium and indium phosphide.

* * * * *